ID# United States 4,012,690

Heytow Mar. 15, 1977

[54] DEVICE FOR SELECTIVELY DETECTING DIFFERENT KINDS AND SIZES OF METALS

[76] Inventor: Solomon Heytow, 9535 Cozycroft, Chatsworth, Calif. 91311

[22] Filed: Apr. 29, 1975

[21] Appl. No.: 572,760

Related U.S. Application Data

[63] Continuation-in-part of Ser. No. 435,454, Jan. 22, 1974, abandoned.

[52] U.S. Cl. .............................. 324/41; 340/258 C
[51] Int. Cl.² ...................................... G01R 33/12
[58] Field of Search ...... 324/41; 340/258 R, 258 C, 340/38 L

[56] References Cited

UNITED STATES PATENTS

| 2,237,254 | 4/1941 | Broekhuysen | 324/41 |
| 2,513,745 | 7/1950 | Reynolds | 324/41 |
| 2,549,567 | 4/1951 | Berman | 324/41 |
| 2,609,530 | 9/1952 | Tricebock et al. | 324/41 |
| 2,753,520 | 7/1956 | Doll | 324/41 |
| 2,869,074 | 1/1959 | Clapp | 324/41 |
| 2,888,026 | 5/1959 | Henderson et al. | 324/41 |
| 2,958,037 | 10/1960 | Riede et al. | 324/41 |
| 3,665,298 | 5/1972 | Geiger | 324/41 |

FOREIGN PATENTS OR APPLICATIONS

| 142,716 | 11/1948 | Australia | 324/41 |
| 403,460 | 4/1943 | Italy | 340/258 R |
| 145,941 | 7/1962 | U.S.S.R. | 324/41 |

OTHER PUBLICATIONS

Luck et al.; The Prison Gun Detector; Radio World; Dec. 1936; pp. 50–56.
Brockheysen; A Practical Metal Detector; Electronics; Apr. 1938; pp. 17–19.
Industrial Metal Detectors; ASEA Journal; 1954; pp. 55–64.

*Primary Examiner*—Robert J. Corcoran

[57] ABSTRACT

A portable support structure is provided with coils mounted therein in spaced parallel relationship to each other. One of the coils is connected to an oscillator and serves as a transmitting coil. The other coils are receiving coils. A detector is connected to the receiving coils. Means are provided for introducing a fixed bias voltage in the receiving coils and for introducing a substantial phase change between the voltage in the transmitting coil and the voltage in the receiving coils so that no usefully shaped ferrous or non-ferrous metal target above a pre-determined size could move through the station without disturbing the voltage and phase angle induced in the receiving coils and thus deceive the station operator. The coils are shielded so that ferrous or non-ferrous metal objects moving outside the station near the coils do not affect the voltage in the receiving coils and provide a spurious indication of a target moving through the station. The phase difference between the voltage in the transmitting coil and the voltage in the receiving coils can be adjusted to maximize the sensitivity of the station to a pre-determined metal or metal alloy.

21 Claims, 10 Drawing Figures

DEVICE FOR SELECTIVELY DETECTING DIFFERENT KINDS AND SIZES OF METALS

This is a continuation in part of patent application Ser. No. 435,454, filed on Jan. 22, 1974, abandoned after this application was filed.

This invention relates to a device for detecting the movement of ferrous and non-ferrous metal objects through a metal detecting station.

BACKGROUND, BRIEF SUMMARY AND STATEMENT OF THE PROBLEM

In recent years the rapidly increasing incidence of airplane hijacking, jail breaks and armed attacks on institutions have been possible because there has been no suitable means for detecting the movement of hidden ferrous or non-ferrous metal objects moving through a restricted zone.

Although metal detecting systems have been known for some time, those previously constructed could be defeated by a concerted effort to find a combination of metals and target shapes which would not affect the station. This is because a ferrous metal object moving through the receiving coils of a metal detector would increase the induced voltage in the receiving coils, while a non-ferrous metal object moving through the receiving coils of the metal detector would decrease the induced voltage in the receiving coils. But, in either case the movement of a ferrous or non-ferrous metal object through the station would upset the voltage in the receiving coils and this change could be detected. In addition the shape of the metal object moving through the metal detector in relation to the shape and orientation of the magnetic field set up by the coils is an important factor in determining the effect the metal object has on the voltage in the receiving coils. All this suggests that a properly shaped weapon formed from a suitable combination of ferrous and non-ferrous metals might pass through the metal detecting station undetected. Therefore, an important object of this invention is to provide a metal detecting station for detecting the movement of ferrous or non-ferrous, or combinations of ferrous and non-ferrous metal objects passing through the station, and in particular to provide a metal detecting station which can detect concerted efforts to defeat the station by constructing weapons from a combination of metals and shapes specifically constructed to defeat prior metal detectors.

Another important object of the invention is to provide a metal detecting station for detecting the movement of ferrous or non-ferrous metal objects concealed on persons passing through the station which is not appreciably affected by the movement of ferrous or non-ferrous metal objects moving outside the station. This is important because when a metal detecting station of the type previously known was installed in an airport, bus terminal, or railway station, the movement of the airplanes, busses, or trains could generate a signal in the detecting station which could confuse the operator. Furthermore, if the station were located far enough away from these vehicles, so the station was not affected by their movement, additional problems could be caused by employees or other persons walking near the station while carrying metal objects, such as pails or tools. This is because such metal objects could produce a voltage output in the receiving coils of the station which could confuse the station operator and lead to the defeat of the metal detecting station by persons who understand its weaknesses.

Furthermore, if attempts were made to install the prior detecting systems in penal institutions, similar problems would be encountered if metal doors were opened or closed near the metal detecting station. Although some of these problems could be reduced by carefully positioning the prior metal detecting station, occasional movements of large metal objects within the institution in the area of the metal detecting station would upset the balance of the system. Also, if the metal detecting station was made portable, all the above described problems would constantly recur each time the metal detecting station was shifted, as when the metal detecting station was moved from one gate to another at an airport.

Another object of this invention is to provide a metal detecting station which can be made insensitive to the movements of tiny ferrous or non-ferrous metal objects passing through the station. This is important where the metal detecting station is to be used in public places where the public gathers in large numbers such as at airports, train or bus stations, stadiums and the like. In these areas, it is important that the metal detecting stations be insensitive to harmless tiny metal objects such as metal frames on glasses, rings, keys and the like, to avoid the slowing of passage of people through the metal detecting station to an unacceptable level. This requires a metal detecting station which can be adjusted so as not to respond to these objects and to fully respond to metal objects of sufficient size to constitute a possible weapon.

The metal detecting station constructed according to the principles of this invention has eliminated these difficulties by introducing a fixed bias voltage in the receiving coils and also introducing a substantial phase change between the voltage in the receiving coils and the voltage in the transmitting coil of the metal detecting station such that no usefully shaped combination of ferrous and/or non-ferrous metals above a pre-determined size could move through the station without disturbing the voltage and/or phase angle induced in the receiving coils and thus deceive the station operator. In addition the problem of externally caused magnetic or electromagnetic influences is eliminated by providing the metal detecting station with shielding which prevents these influences from having any appreciable effect on the metal detecting system inside the station. This is accomplished by attaching ferrous sheet metal rigidly to the walls of the metal detecting station. In this way external ferrous or non-ferrous metal objects moving relative to the station have no appreciable effect on the detecting system in the station.

These and other objects of this invention will be better understood in the light of the accompanying specification and drawings herein.

Figures 1, 3:
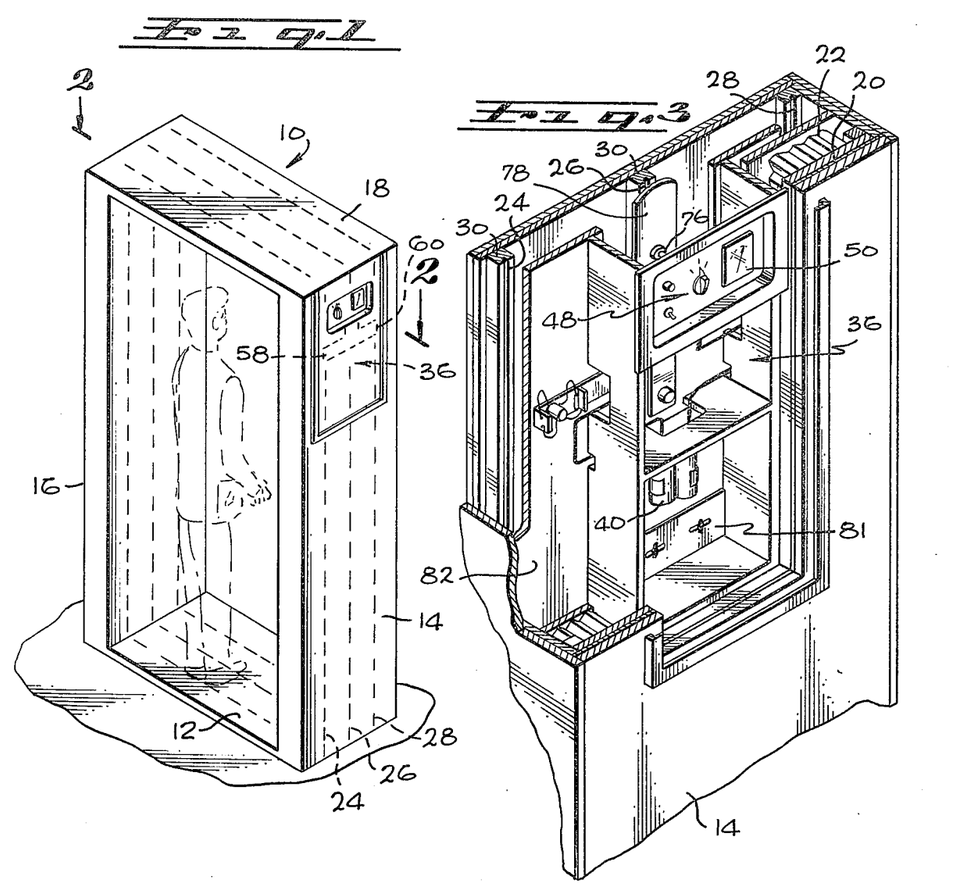
FIG. 1 is a perspective view of the metal detecting station constructed according to the principles of this invention.
FIG. 3 is a perspective view of a portion of a wall showing portions of the electrical detecting system in position.
Figure 4:
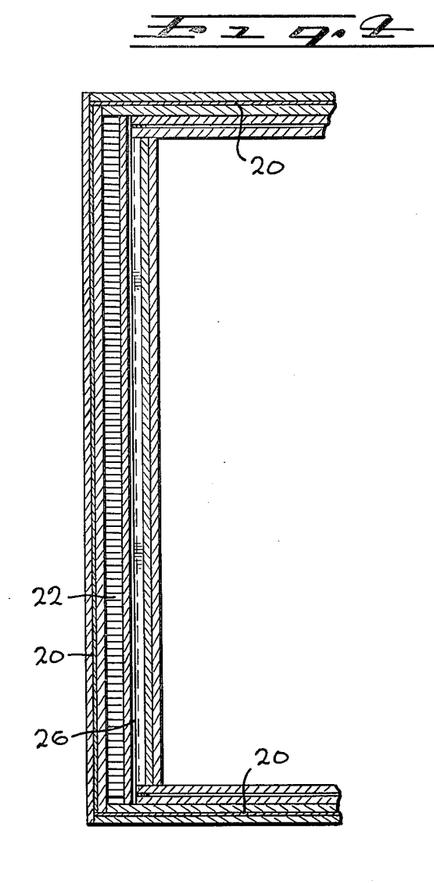
FIG. 4 is a sectional view taken on line 4—4 of FIG. 2.

Referring now to FIG. 1 of the drawing, a detecting station indicated generally by the reference 10 is in the particular embodiment shown, portable, and comprises a support structure shaped like a doorway. The support structure includes a base wall 12, side walls 14 and 16, and a top wall 18, all rigidly attached together. As shown, the station is large enough to permit a person to walk through. The walls of the station are formed in layers and the outer layer is constructed from an insulating material such as plastic or plywood. Sheet metal 20, constructed from a ferrous material or a material which has the same electromagnetic properties as iron, is mounted inside the side walls 14 and 16, base 12, and in the top wall 18 to provide shielding for the station so that ferrous or non-ferrous metal objects moving outside the station near those walls will have no appreciable effect on the detecting system in the station, see FIGS. 2 and 4. The sheet metal 20 is kept rigidly and securely in place flat against the inner surface of the walls by means of a light, inexpensive, cellular stiffening material 22, see FIG. 4. With this arrangement, the sheet metal is pressed between the outer walls and the cellular material so it will not be disturbed when the station is moved. This is important because any disturbance in the metal shielding could effect the electromagnetic field in the station and introduce error.

Figure 2:
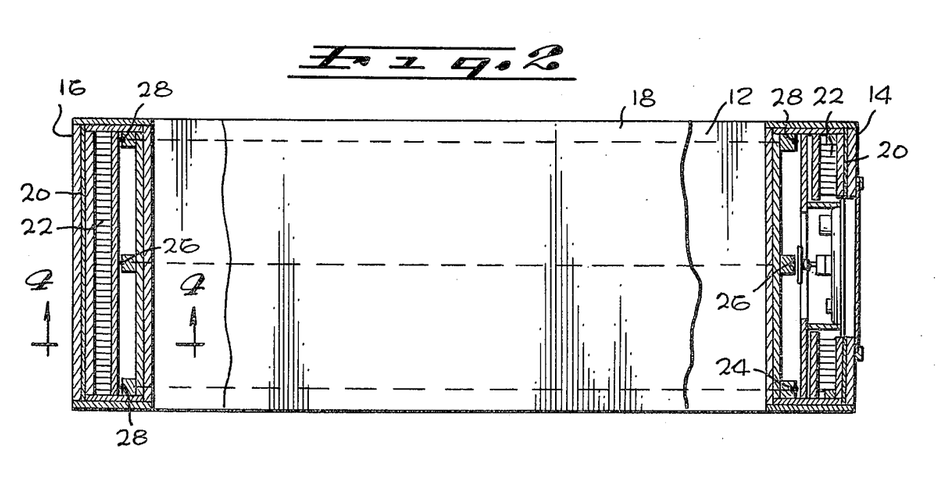
FIG. 2 is a plan view, partly broken away, taken on a line 2—2 of FIG. 1.
Figure 9:
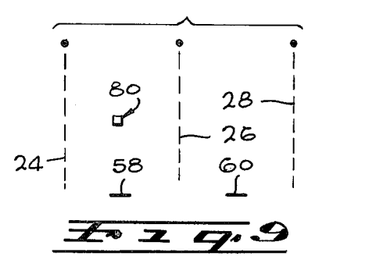
FIG. 9 diagrammatically shows the location of the transmitting and receiving loops in the station and the location of the wing loops as a target moves through the station.

As seen in FIG. 1, three generally identical coils or single turn wire loops 24, 26 and 28, are mounted in the walls of the station 10 in spaced parallel relationship to each other. These loops extend around the station inside the base 12, side walls 14 and 16, and in the top wall 18. Wire loop 26 is the energy transmitting loop and is mounted in the center of the station as shown in FIGS. 1 and 2. Energy receiving loops 24 and 28 are mounted in each side of the transmitting loop 26, preferably equidistant from the transmitting loop. As seen in FIGS. 1 and 9, in this particular embodiment, the wire loops are mounted in planes perpendicular to the passageway through the metal detecting station. However, the principles of this invention could be practiced with coils or loops positioned in planes which are not perpendicular to the passageway through the station.

It is necessary to mount the wire loops fairly rigidly in the station because any appreciable movement of the wire loops would disturb the electromagnetic field and introduce error. To hold the wire loops rigidly in position, strips 30 formed from wood, plastic or other suitable insulating material, are mounted in the walls of the station and these strips are provided with grooves 32 in which the wire loops are fastened by any suitable means. In the embodiment shown, the loops are positioned so the person or target moves through the loops. However, under some circumstances the principles of this invention could be practiced with the loops positioned so the target does not pass through them.

Figure 8:
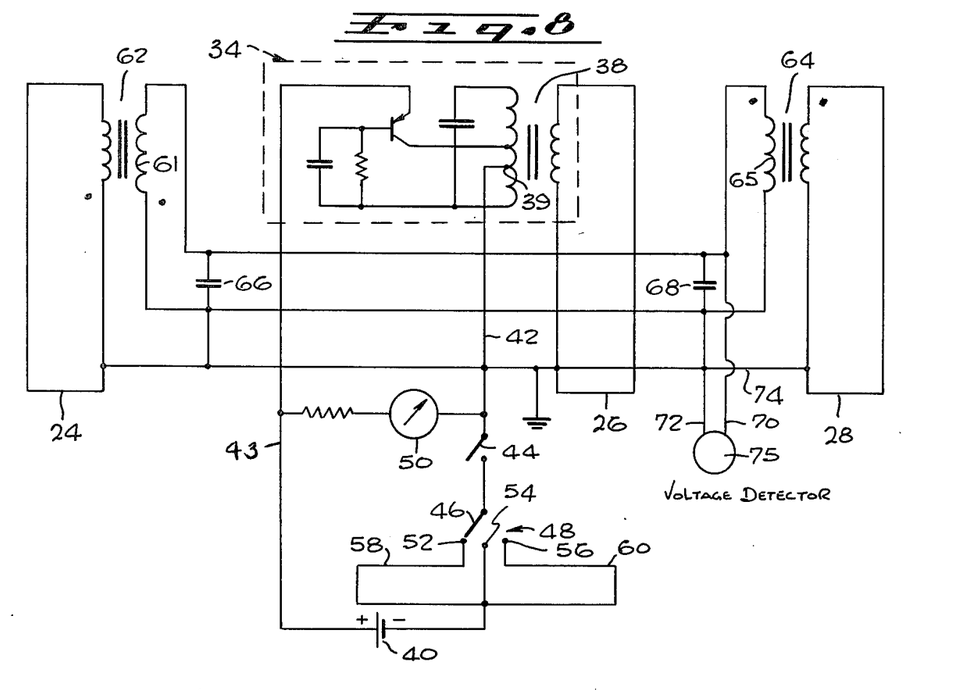
FIG. 8 is a circuit diagram of the metal detecting station.

A generally conventional transistorized oscillator 34 is mounted on a removable support in the wall 14 of the station at region 36, see FIGS. 1, 3, and 8. The oscillator includes a transformer 38 which serves a double function in that it cooperates with the circuit elements in the oscillator to generate the oscillator frequency at 24 kc, which has been shown to be suitable, although other frequencies may be used, and in addition, the secondary coil of the transformer is coupled to the center transmitting loop 26 and functions to match the impedance of the single turn center loop with the oscillator impedance, thus eliminating the need for multiple turn coils and the consequent errors which could be introduced by their use.

The oscillator is powered by means of a battery 40, the positive side of which is connected to the emitter of a PNP transistor in the oscillator as shown. An auxiliary voltage output taken from the tap 39 in the transformer 38 is 90° out of phase with the voltage from the main output going to loop 26. This voltage is fed through lead 42 and from there to the power switch 44. Switch 44 is connected to the rotary arm 46 of a three contact switch 48. Switch 48 includes contact 52, 54, and 56 as shown. Contact 54 is a test position contact and its physical location is important for reasons to be described below because when arm 46 engages contact 54 and there is no target in the station, there is no output voltage from the receiving coils in the metal detecting station. A battery testing meter 50 connected between leads 42 and 43 is provided as shown to indicate the condition of the battery.

Figure 10:
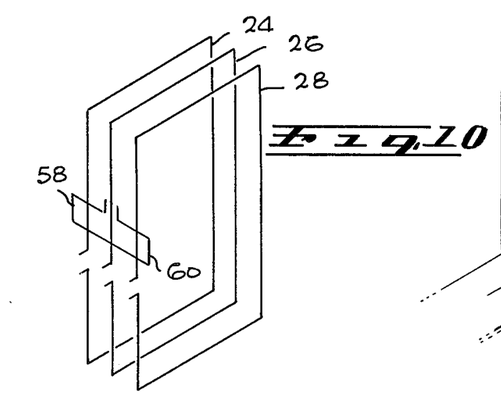
FIG. 10 is a perspective diagrammatic view showing the transmitting and receiving loops and the wing loops.

Two small single turn wing loops 58 and 60 are connected together. These loops have spaced contacts 52 and 56, as shown in FIG. 8, and they are mounted on side wall 14 in a plane perpendicular to the planes defined by loops 24, 26 and 28. See FIGS. 9 and 10. As shown in FIG. 10, wing loop 58 is nearer to receiving loop 24 and wing loop 60 is nearer to receiving loop 28. The position of arm 46 with respect to contact 52 and 56 determines the entrance and exit of station 10 because by simply moving arm 46 from contact 52 to contact 56 the direction of current flow through the wing loops 58 and 60 is reversed so that the entrance and exit of the station can be reversed.

As stated above, in this particular embodiment, receiving loops 24 and 28 are identical to transmitting loop 26 in size and these loops must be tuned to resonance with loop 26 at 24kc along with the oscillator 34. This tuning is done by means of identical receiving transformers 62 and 64 and capacitors 66 and 68. It is noted, however, that the principles of this invention could be practiced even if the receiving loops were not exactly identical to the transmitting loops or exactly parallel to each other or exactly equidistant on opposite sides of the transmitting loop. However, under such circumstances more expensive circuit elements would have to be used.

The output coils 61 and 65 of the transformers 62 and 64 are connected to each other in phase opposition with respect to each other. The output signal of the station 10 is taken through leads 70 and 72 which are connected to the ground strip 74 and to a suitable A.C.

voltage detector 75, such as a delta voltage indicator, i.e. a meter for indicating small changes in voltage.

Figure 5:
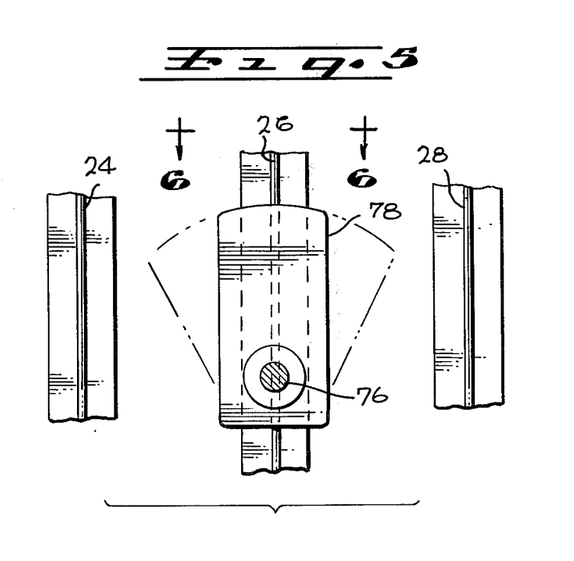
FIG. 5 is an enlarged elevational diagrammatic view showing part of the means for introducing a fixed voltage in the receiving coils of the metal detecting system.
Figure 6:
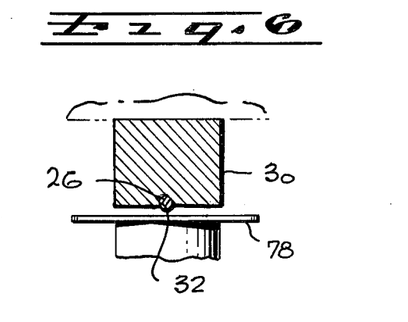
FIG. 6 is a sectional view taken on a line 6—6 of FIG. 5.

As seen in FIGS. 3, 5, and 6, shaft 76 of the rotary arm 46 of switch 48 is connected to a metal fin 78 which in this embodiment happens to be formed from aluminum, although this is not critical. This fin rotates with arm 46 for reasons to be described below. As shown in FIG. 5, the shaft 76 is located so when the rotary arm 46 is in a test position at 54, the fin 78 is equidistant from the receiving loops 24 and 28. Further, as shown, the fin 78 moves closer to the receiving loops 24 or 28 as the rotary arm 46 is moved to engage electrical contacts 52 or 56. This introduces a bias or fixed voltage in the receiving loop nearest the fin 78.

When there is no target in the station, and arm 46 is connected to test terminal 54, and fin 78 is equidistant from receiving coils 24 and 28, the output signal in leads 70 and 72 will be zero. This is because in this embodiment the two receiving loops 24 and 28 are identical and equidistant from the transmitting loop 26 on each side of it and the receiving loops 24 and 28 are coupled in phase opposition with each other as shown in FIG. 8. As wil be explained below this arrangement permits a test of the electrical circuit because if the loops are not properly positioned, or there is something wrong with the circuit, the output signal on leads 70 and 72 will not be zero.

Since coils 24, 26 and 28 are all parallel with respect to each other, the station can be shielded from electromagnetic influences originating outside the station by the use of the ferrous sheet metal as described above. This is very important when the metal detecting station is to be installed in areas where large masses of metal such as busses, trains, airplanes or metal doors move by the station, because such movement would otherwise disturb the electromagnetic field inside the station causing an erroneous signal. This arrangement is also effective to prevent any disturbances of the electromagnetic field inside the station caused by persons walking by the station carrying metal objects or tools. With the shielding described above, such movements outside of the station have little effect on the station and do not generate any detectable output signals in leads 70 and 72, as would be the case if the transmitting and receiving loops or coils in the station were arranged in quadrature.

As stated above, the effect of the fin 78 when the switch 48 is adjusted so arm 46 engages contacts 52 or 56 is to introduce a fixed bias voltage in the nearest receiving loop. This in effect introduces an artificial target in the station so that there will always be a substantial output on the voltage detector 75. If there were no bias voltage in the receiving loops and they were opposite in phase, there would be no signal in the detector 75. Consequently, the voltages produced by tiny metal particles moving through the station have a very large percentage effect on a detector which has no bias voltage so that the metal detector 75 would have a substantial response to tiny metal objects. In some circumstances this may be desirable, but as stated above, when the detector is used to locate objects the size of weapons, and is to be used in airports and train stations, it is necessary to prevent the metal detector from detecting objects of no interest in order not to delay the movement of passengers. It is clear that if the bias voltage in the receiving loops causes a substantial voltage output to appear on the detector 75 when there is no metal object passing through the station, the effect of tiny metal objects, such as nails in shoes, keys, etc., moving through the station would be very small in proportion to the bias voltage so the detector 75 would not respond significantly to the passage of these tiny metal objects and the flow passengers could be speeded.

Consequently the metal detecting station will be comparatively insensitive to the movement of smaller ferrous or non-ferrous metal objects such as eyeglass frames, key, lighters, compacts, or the like in the station. As a result the speed of persons or objects moving through the station can be substantially increased.

Now referring to FIG. 9, if a ferrous metal object moves through the station 10, it induces a voltage, and/or phase change in the output signal on leads 70 and 72. Similarly if a non-ferrous metal object moves through the station it would also induce a voltage and/or phase change in the output leads 70 and 72, but the effect of the non-ferrous metal would be opposite to the effect of the ferrous metal. Consequently it is conceivable that a weapon could be fabricated from a suitable combination of metals and shapes which would not induce an appreciable voltage in the receiving loops as the weapon moved through the station, and the operator could be deceived. The possibility has been eliminated by the structure shown in the drawings.

As shown in FIGS. 1 and 3, the wing loops 58 and 60 are mounted on a support which is removably mounted on side wall 14. Since in tuned circuits the output currents are 90° out of phase with respect to the voltage, the electrical connection shown in FIG. 8 wherein tap 39 at transformer 38 is connected through the rotary switch 48 to the wing loop contacts 52 or 56 has the effect of supplying current to the wing loop which lags 90° from the current of the transmitting loop.

If the receiving loops 24 and 26 are first provided with a bias voltage as from the metal fin 78 or from any other means, the magnetic field produced in the wing loops 58 and 60, when they are energized as described above, changes the phase relationship between the voltage in the transmitting loop and the voltage in the receiving loops in an amount and direction determined by the size, spacing, and composition of the fin, and by the size, shape, and current magnitude and current direction in the wing loops. This is important because if the phase relationship between the transmitting and receiving loops is left to chance the metal detecting station could be completely or substantially insensitive to either ferrous or non-ferrous metals. But by properly adjusting the phase relationship, by selecting the proper size, spacing and composition of the fin, and selecting the proper size, shape and current in the wing coils as noted above, so there is a preferable angle, such as a 45° phase difference between the transmitting and receiving coils, the metal detecting station will be sensitive to ferrous and non-ferrous metals. This also suggests that the station can be deliberately sensitized to specific metals or metal alloys and desensitized to other metals or metal alloys to discriminate between the metals by the proper selection of the size and shape of the fins and wing coils. This is possible because a maximum sensitivity to any particular metal or metal alloy requires a particular phase difference between the voltage in the transmitting coil and the voltage in the receiving coil, and the structure described above permits the phase relationship between the voltage in the transmitting coil and the receiving coil to be adjusted as desired. In addition the phase difference between the transmitting and receiving coils caused by the operation of the metal fin and the wing loops will also distort the magnetic field inside the station so that no likely target configuration or orientation of target could pass through the station undetected. Without this arrangement, if the magnetic field had a known regular or orderly shape, a person might be able to walk through the station while changing the orientation of a hidden metal object in such a way that the object will not cut enough lines of magnetic force to generate a signal large enough to be detected.

Now referring again to FIG. 9, when a ferrous metal object moves in station 10 between loops 24 and 26 as indicated, and if fin 78 is constructed from a non-ferrous metal such as aluminum and has been moved between loops 24 and 26 as indicated in FIG. 5, the effect of the ferrous metal is to counter the effect of the fin so that there would be an initial voltage drop in the output voltage of the receiving loops 24 and 28. This drop in voltage, however is reversed as the target moves further through the station between loops 26 and 28 because loop 28 is connected to loop 24 in phase opposition, so that in this situation there is an augmentation of the electromagnetic energy in the receiving loops. On the other hand, if the ferrous metal object moved through the station in the opposite direction, with the above location of the fin, there would be an initial rise in the voltage output of the receiving loops 24 and 28 as the target moved between loops 26 and 28 followed by a drop in voltage as the ferrous metal object moved further on between loops 24 and 26. Consequently the metal detecting station will respond differently to persons or objects moving through the station in different directions. This effect can also be used to make certain other persons entering an area have left the area by a predetermined time. This can be done by simply connecting the voltage output from the receiving loops to a suitable counter which is set up to count the number of persons entering the area and then subtracting the number of persons passing through the station when the time has come for them to leave.

To this point, the metal detecting station has been shown as applied to a ferrous and non-ferrous portable metal detecting station used for detecting hidden ferrous or non-ferrous objects carried by a person entering a controlled area. However, as shown in FIG. 7, the detecting station could also be used to detect weapons constructed from ferrous or non-ferrous metal objects and hidden in packages which are not normally carried by a person.

The portability of the metal detecting station 10 introduces a problem in that after the station has been installed and the electromagnetic field inside the station is properly adjusted, occasional movement of large masses of metal, as when employees of the installation permanently shift large metal chests or metal tools or rearrange metal objects around the entrance or exit of its station, could affect the electromagnetic field inside the station despite the shielding. To compensate for this the station is provided with an adjustable metal plate 81 mounted on the support 82. This plate 81 in this position is formed from aluminum and as shown, is movable on support 82 in the planes parallel to the plane of the fin 78. Consequently, any disturbance of the electromagnetic field caused by positioning a large stationary metal object near the entrance or exit of the station, can be compensated for by adjusting the metal plate 81 as shown in FIG. 3.

Figure 7:
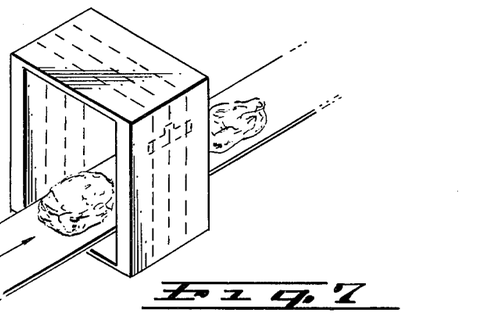
FIG. 7 is a perspective view of another embodiment of a metal detecting station used to detect the presence of ferrous or non-ferrous metal objects or weapons concealed in packages or sacks which do not normally carry them.

Furthermore, although the detecting station shown in FIG. 1 and 7 is shown to be portable and comprises top, bottom and side walls, the principles of this invention could be practiced on non-portable configurations as where the transmitting and receiving loops ae installed in the walls, ceilings and floors of existing structures.

Although to this point the invention has been directed to a means for detecting the movement of hidden ferrous or non-ferrous metal objects moving through a detecting station, it is of course understood that the principles of this invention could be applied to the detection of the omission of metal objects in the places where metal is supposed to be.

For example, manufactured parts may be constructed largely of nonmetallic materials but they may still have some internal metal parts. Under such circumstances, the metal detecting station described above could function as a station for inspecting the parts to make sure all the metal parts have been included, because the complete absence of the metal part would be indicated by a lack of proper response in the detector 75.

Furthermore, the packages going through the station may contain a valuable metal having a certain size and shape. If an appreciable quantity of the metal were missing the absence or decreased quantity would be indicated in the detector 75 because experience would indicate the proper meter reading when the correct quantity of metal is in the package moving through the system. In this way by reading the indicator the operator could determine either the absence of the metal or the extent of the variation in the quantity of metal that should have been present in the article.

Having described the invention, what I claim as now is:

1. A metal detecting station for detecting the movement of deliberately hidden ferrous or non-ferrous metal objects through said station comprising a transmitting coil and at least one receiving coil, said transmitting coil and said at least one receiving coil disposed in spaced relationship to each other, a signal generator connected to said transmitting coil for inducing an electromagnetic field in said at least one receiving coil, first means associated with said station for producing a fixed voltage output in said at least one receiving coil, second means in said station and associated with said first means in such a way that said second means operates only when said first means operates and induces a phase shift between the transmitting coil and said at least one receiving coil, said phase shift in a direction such that the metal-detecting station is sensitive to ferrour or non-ferrous metal objects passing through the station and sufficiently large to distort the electromagnetic field inside the metal-detecting station so that no likely combination of target-shape or target-orientation could pass through the station without disturbing the voltage in said receiving coil, and means associated with the station and connected to said at least one receiving coil for providing an indication of any voltage change in said at least one receiving coil caused by the passage of a metal object through the station.

2. The metal detecting station described in claim 1 wherein said fixed voltage output introduced into said at least one receiving coil is of sufficient magnitude to make the metal detecting station comparatively insensitive to the movement of metal objects through the station which are smaller than metal objects of interest.

3. A metal detecting station for detecting the movement of deliberately hidden ferrous or non-ferrous metal objects through the station which are greater than a predetermined size, said metal detecting station having an interior portion and at least one planar wall, said at least one planar wall formed from a plurality of layers, one of said layers formed from an insulating material and comprising a rigid support layer, at least one other layer formed from a thin ferrous sheet metal, means securing such ferrous sheet metal to said rigid support layer whereby said rigid support layer and ferrous sheet metal are generally coextensive and the ferrous sheet metal is rigidly supported thereby in a fixed position on said wall, said layer of ferrous sheet metal serving to shield the interior of said station from electromagnetic signals or magnetic influences caused by ferrous or non-ferrous metal objects moving by said wall outside said station, detecting means associated with this station for detecting the movement of objects through said station, said detecting means comprising a transmitting coil and at least one receiving coil, said transmitting coil and said at least one receiving coil in spaced relationship to each other, a signal generator connected to said transmitting coil for inducing an electromagnetic field in said at least one receiving coil, first means in said station for producing a fixed voltage output in said at least one receiving coil of sufficient magnitude to make the metal detecting station comparatively insensitive to metal objects substantially smaller than metal objects of interest to prevent spurious indications in the station caused by the movement of said tiny metal objects through the station, second means in said station and associated with said first means in such a way that said second means operates only when said first means operates and induces a phase shift between the transmitting coil and said at least one receiving coil in such a direction that the metal detecting station is sensitive to the movement of both ferrous and non-ferrous metal objects through the station and sufficiently large to distort the electromagnetic field inside the station so that no likely combination of target-shape or target-orientation could pass through the station without disturbing the voltage in said at least one receiving coil, and means associated with said station and connected to said at least one receiving coil for providing an indication of any voltage change in said at least one receiving coil caused by the passage of a metal object through the station.

4. A metal detecting station for detecting the movement of deliberately hidden ferrous or non-ferrous metal objects through the station which are greater than a predetermined size comprising a single turn transmitting coil and two single turn receiving coils disposed in spaced parallel relationship to each other on opposite sides of the transmitting coil and positioned so that objects passing through the station must pass through the coils, a signal generator connected to said transmitting coil for inducing an electromagnetic field in the receiving coils, first means associated with said station for producing a fixed voltage output in said receiving coils which is of sufficient magnitude to make the metal detecting station comparatively insensitive to metal objects substantially smaller than metal objects of interest to prevent the station from responding to the movement of tiny metal objects through the station, second means in said station and associated with said first means in such a way that said second means operates only when said first means operates to induce a phase shift between the transmitting coil and said receiving coil in such a direction that the metal detecting station is sensitive to both ferrous or non-ferrous metal objects passing through the station and sufficiently large to distort the electromagnetic field inside the station so that no likely combination of target-shape or target orientation could pass through the station without disturbing the voltage in said receiving coils, and means associated with said station and connected to said receiving coils for providing an indication of any voltage change in said receiving coils caused by the passage of metal objects of sufficient size through the station.

5. A metal detecting station for detecting the movement of deliberately hidden ferrous and non-ferrous metal objects above a predetermined size through said station, said station having opposed ends, and detecting means therein for detecting the movement of ferrous or non-ferrous metal objects through the station, said detecting means comprising a single turn transmitting loop and two single turn receiving loops positioned in a spaced relationship to each other on each side of the transmitting loop and adjacent to said opposed ends of the station, an oscillator associated with said station, said oscillator including a transformer, the secondary coil of said transformer connected to said transmitting loop for inducing an electromagnetic field in said transmitting loop and serving both to determine the frequency of the oscillator and to match the impedance of the oscillator to the impedance of the single turn transmitting loop thereby permitting the transmitting loop to be formed from a single turn of wire, means connected to said receiving loops to tune said receiving loops to the frequency of the transmitting loops, first means associated with the station for producing a fixed voltage output in said receiving loops of sufficient magnitude to make the metal detecting station comparatively insensitive to metal objects substantially smaller than metal objects of interest to prevent the station from responding to the movement of said tiny metal objects through the station, second means in the station and associated with said first means in such a way that the second means operates only when said first means operates to induce a phase shift between the transmitting loop and said receiving loops, said phase shift directed so the metal detecting station is sensitive to both ferrous and non-ferrous metal objects passing through the station and sufficiently large to distort the electromagnetic field inside the station so that no likely combination of target-shape or target-orientation could pass through the station without disturbing the voltage on said receiving loops, voltage indicator associated with said station and connected to said receiving loops for providing an indication of any voltage change in said receiving loops caused by the passage of ferrous or non-ferrous metal objects through the station, said second means for providing said phase shift between the transmitting loop and said receiving loops comprising at least one wing loop mounted in a plane generally perpendicular to the planes of the transmitting and receiving loops and mounted between a receiving loop and said transmitting loop, said wing loop positioned generally transverse to a side of said transmitting and receiving loops, means connected to the said at least one wing loop and said oscillator for providing said at least one wing loop with current 90 degrees out of phase with respect to the current supplied to the transmitting loop whereby the current in the said at least one wing loop produces a magnetic field which changes the phase relationship between the voltage in the associated receiving loop and the voltage in the transmitting loop when the first means in the station produces said fixed voltage output in the receiving loops.

6. The metal detecting station described in claim 5 wherein said first means for producing a fixed voltage output in said receiving loops comprises a piece of metal which is movably disposed near one receiving loop.

7. The metal detecting station described in claim 5 wherein said second means for producing a phase shift between the voltage in the transmitting loop and the voltage in the receiving loops comprises two single turn wire wing loops mounted in a plane generally perpendicular to the planes of the transmitting and receiving loops, each wing loop positioned near a receiving loop at one end or the other of said station and associated therewith, a multiple position switch associated with the station, one end of a wire in each wing loop connected to a terminal of the multiple position switch, said multiple position switch including a shaft mounted rotary arm connected to the oscillator and adapted to be electrically connected to one of the terminals of the multiple position switch to selectively energize an associated wing loop, said wires in each wing loop disposed so they extend in generally opposite directions from the center of the station to the opposed ends of the station whereby the direction of current flow through said wing loops with respect to the station can be reversed depending on which terminal the rotary arm of the multiple position switch is connected to, said rotary arm connected to the said oscillator in such a way that the current supplied to the wing loops is 90° out of phase with respect to the current supplied to the transmitting loop, whereby the current in the energized wing loop produces a magnetic field which changes the phase relationship between the voltage in the transmitting loop and the voltage in the receiving loop associated with the energized wing loop, in a direction such that the station responds to the movement of a ferrous or non-ferrous metal object of sufficient size passing through the station.

8. The metal detecting station described in claim 7, wherein said receiving loops are substantially identical and equidistant from the transmitting loop, on each side thereof, and wherein said first means comprises a sheet metal film, said fin connected to the shaft of the rotary arm of the multiple position switch, said shaft and fin positioned so that the fin is movable toward one or the other of the receiving loops depending on which terminal the rotary arm engages, said multiple position switch having a test terminal, said test terminal of the multiple position switch so positioned in the station that when the rotary arm is connected to the test terminal, neither wing loop is energized and the metal fin is equidistant from both receiving loops so that if no target is passing through the station the voltage output from the receiving loops is null whereby errors in assembly or shifts in the position of the transmitting and receiving loops and wing loops can be detected.

9. A metal detecting station for detecting hidden ferrous of non-ferrous metal objects carried by a person, said station having an interior portion with at least one wall, said wall formed from a rigid insulating material and comprising a support, at least one layer formed from sheet metal, means rigidly securing said sheet metal layer to said rigid support so it lies coextensive therewith whereby said planar layered wall shields the interior of the station from external magnetic or electromagnetic influences originating outside the station, said station having detecting means therein for detecting the movement of ferrous or non-ferrous metal objects moving through the station, said detecting means comprising a single turn transmitting loop and two single turn receiving loops positioned on each side of said transmitting loop in spaced relationship to each other and adjacent opposed ends of the station, an oscillator associated with said station, said oscillator including a transformer, the secondary coil of said transformer connected to said transmitting loop for inducing an electromagnetic field in said receiving loops and serving both to determine the frequency of the oscillator and to match the impedance of the oscillator to the impedance of the single turn transmitting loop, thereby permitting the transmitting loop to be formed from a single turn of wire, means connected to said receiving loops to tune said receiving loops to the frequency of said transmitting loop, said receiving loops connected together in phase opposition, a detecting meter adapted to be connected to said receiving loops to detect the voltage difference between them, first means in the station associated with one of said receiving loops for producing a fixed voltage output in said associated receiving loop whereby the detecting meter receives an output signal when no ferrous or non-ferrous target is moving through the station so it can discriminate between mechanical vibrations, affecting the meter, transient magnetic or electromagnetic disturbances in the station, and between ferrous or non-ferrous metal targets moving through the station, and second means for introducing a controlled phase shift between the voltage in the transmitting loop and the voltage in the receiving loops, said second means comprising at least one wire wing loop mounted in a plane generally perpendicular to the planes of the transmitting and receiving loops, and mounted between a receiving loop and the transmitting loop, said wing loop including at least spaced generally parallel wires positioned generally transverse to a side of said transmitting and receiving loops and including a connecting wire connected between said generally parallel wires, means connected between said wing loop and said oscillator for supplying the wing loop with current 90° out of phase with respect to the current supplied to the transmitting loop whereby the current in the wing loop produces a magnetic field which changes the phase relationship between the voltage in the transmitting loop and the receiving loop so that a metal object passing through the station disturbs the said fixed voltage and/or said phase relationship in the receiving loop.

10. The metal detecting station described in claim 9 wherein said first means for producing fixed voltage in a receiving loop, is a piece of metal movably disposed near one receiving loop.

11. The metal detecting station described in claim 9 wherein said second means for introducing said controlled phase shift comprises two single turn wire wing loops mounted in a plane generally perpendicular to the planes of the transmitting and receiving loops, each wing loop positioned near a receiving loop at one end or the other of said station and associated therewith and comprising spaced parallel wires and a connecting wire connected between the parallel wires, a multiple position switch associated with the station, one end of a parallel wire in each wing loop connected to a terminal of the multiple position switch, said multiple position switch including a shaft mounted rotary arm connected to the oscillator and adapted to be electrically connected to one of the terminals of the multiple position switch to selectively energize one of the wing loops, said parallel wires in each wing loop disposed so they extend in opposite directions from the center of the station to the opposed ends of the station whereby the direction of current flow through said wing loops with respect to the station can be reversed depending on which terminal the rotary arm of the multiple position switch is connected to, said rotary arm connected to the said oscillator in such a way that the current supplied to the wing loops is 90° out of phase with respect to the current supplied to the transmitting loop, whereby the current in the energized wing loop produces a magnetic field which changes the phase relationship between the voltage in the transmitting loop and the voltage in the receiving loop associated with the energized wing loop so that a metal object passing through the station disturbs the said fixed voltage and/or said phase relationship in the associated receiving loop.

12. The metal detecting station described in claim 11 wherein the transmitting loop is positioned equidistant between the receiving loops and the receiving loops are identical and electrically connected together in phase opposition, and said first means for producing a fixed voltage in the receiving loop comprises a sheet metal fin, said fin connected to the shaft of the rotary arm of the multiple position switch, said shaft and fin positioned so that the fin is movable toward one or the other of the receiving loops depending on which terminal the rotary arm engaged, whereby said change in the phase relationship caused by the energized wing loop and said fixed voltage produced in the associated receiving loop by said metal fin are of such magnitude that no reasonably likely combination of target material and shape can move through the station without disturbing said fixed voltage and/or said phase relationship in said receiving loop, said multiple position switch having a test terminal, the test terminal of the multiple position switch so positioned in the station that when the rotary arm is connected to the test terminal, neither wing loop is energized and the metal fin is equidistant from both receiving loops so that if no target is passing through the station the voltage output from the receiving loops is null whereby errors in assembly or shifts in the position of the transmitting and receiving loops and wing loops can be detected.

13. The metal detecting station described in claim 9 wherein the detecting station comprises a base wall layered planar side walls and a layered planar top wall, all rigidly connected together, said station rectangular in cross-section, one layer of the planar side walls and top walls formed from a rigid insulating material, a second layer of said walls and said top walls formed from a planar sheet metal, a third layer of the side and top walls formed from another insulating support material, said layers of insulating material secured tightly together with said sheet metal mounted between so that the sheet metal is rigidly mounted between the insulating layers of the side walls and the top walls, whereby the interior of the metal detecting station is shielded from electromagnetic disturbances and influences caused by moving ferrous and non-ferrous metal objects outside the station.

14. The metal detecting station described in claim 13 wherein the plane of the transmitting and receiving loops is perpendicular to the plane of the side walls and top walls of the station and wherein said receiving loops are rectangular in shape and are generally co-extensive with the cross-section of the metal detecting station, said receiving loops mounted so the sides of the receiving loops are closely adjacent the side walls and top wall of the station.

15. The metal detecting station described in claim 14 including means for holding said single turn wire loops rigidly in said station.

16. The detecting station described in claim 15 wherein said means for holding said single turn wire loops rigidly in position in said station include strips formed from a suitable rigid insulating material, said strips rigidly mounted in the station against said walls and top wall, wire receiving grooves formed in said strips, said single turn loops mounted in the wire receiving grooves in said strips whereby said strips hold the single turn loops rigidly in the station, and in addition rigidly hold the sheet metal layers in position in the side walls and top wall.

17. The metal detecting station described in claim 16 including means associated with said metal detecting station for compensating the metal detecting station for the presence of massive ferrous or non-ferrous metal objects adjacent the station.

18. A metal detecting station for detecting the movement of deliberately hidden ferrous or non-ferrous metal objects greater than a predetermined size through said station, said station having an interior portion and at least one planar wall, said at least one planar wall formed from a plurality of layers, one of said layers formed from an insulating material and comprising a rigid support layer at least one layer formed from a thin ferrous sheet metal, means securing said ferrous sheet metal to said rigid support layer whereby said ferrous sheet metal is coextensive with said rigid support layer and is rigidly supported thereby in a fixed position on said wall, said layer of ferrous sheet metal serving to shield the interior of the station from electromagnetic signals or magnetic influences caused by ferrous or non-ferrous metal objects moving by said wall outside the station, detecting means in the station for detecting the movement of ferrous or non-ferrous metal objects moving through the station, said detecting means comprising a single turn transmitting coil and two single turn receiving coils disposed in space parallel relationship to each other on opposite sides of said transmitting coil and positioned so that objects passing through the station must pass through the coils, said single turn coils positioned so that they are each generally perpendicular to said at least one planar wall and shaped so that one side of said coil lies closely adjacent to said planar wall, a signal generator connected to said transmitting coil for inducing an electromagnetic field in said receiving coils, first means associated with a station for causing a fixed voltage output in said receiving coils of sufficient magnitude to make the metal detecting station comparatively insensitive to metal objects substantially smaller than metal objects of interest to prevent the station from responding to the movement of said tiny metal objects through the station, second means in said station and associated with said first means in such a way that said second means operates only when said first means operates, to produce a phase shift between the transmitting coil and said receiving coil in such a direction that the metal detecting station is sensitive to both ferrous and non-ferrous metal objects passing through the station, said phase shift being large enough to distort the electromagnetic field inside the station so that no likely combination of target-shape or target-orientation could pass through the station without disturbing the voltage on said receiving coils, and means associated with this station and connected to said receiving coils for producing an indication of any voltage change in said receiving coils caused by the passage of metal objects through the station.

19. A metal detecting station, said station having an interior portion defined by at least spaced parallel planar side walls and a connecting planar top wall, all of said walls formed from a plurality of layers, one of said layers in each wall formed from an insulating material and comprising a rigid support layer, at least one other layer in each wall formed from a thin ferrous sheet metal, means securing said ferrous sheet metal to said rigid support layer whereby said ferrous sheet metal is coextensive with said rigid support layer and is rigidly supported thereby in a fixed position in said wall, said layers of sheet metal in the side walls and the top wall of the station serving to shield the interior of the station from electromagnetic signals or magnetic influences caused by ferrous or non-ferrous metallic objects moving by said wall outside the station, detecting means in the station for detecting the movement of ferrous or non-ferrous metal objects moving through the station, said detecting means comprising a single turn transmitting loop and two single turn receiving loops disposed and spaced parallel relationship to each other and positioned on opposite sides of the transmitting loop and positioned so that objects passing through the station must pass through the loops, each single turn loop positioned so it lies in a plane perpendicular to the planes of the planar side walls and the planar top wall and shaped so that one side of each loop lies closely adjacent to said planar side wall and one side of each loop lies closely adjacent to said planar top wall, a signal generator connected to said transmitting loop for inducing an electromagnetic field in the receiving loops, said signal generator comprising an oscillator including a transformer, the secondary coil of said transformer connected to said transmitting loop and serving to match the impedance of the oscillator to the impedance of a single turn transmitting loop, means connected to said receiving loops to tune said receiving loops to the frequency of the transmitting loop, said means including transformers for each of said receiving loops, first means associated with said station for producing a fixed voltage output in said receiving loops of sufficient magnitude to make the metal detecting station comparatively insensitive to the movement of tiny metal objects through the station, second means in said station and connected to said first means in such a way that it operates only when said first means operates to induce a phase shift between the transmitting loop and the receiving loops in such a direction that the metal detecting station is sensitive to both ferrous and non-ferrous metal objects passing through the station, said phase shift large enough to distort the electromagnetic field inside the metal detecting station so that no likely combination of target-shape or target-orientation could pass through the station without disturbing the voltage on said receiving loops, and means associated with this station and connected to said receiving loops for providing an indication of any voltage change in said receiving loops caused by the passage of metal objects of sufficient size through the station.

20. A metal detecting station for detecting the movement of deliberately hidden ferrous or non-ferrous metal objects greater than a predetermined size through the station, said station having opposed ends and detecting means therein for detecting the movement of ferrous or non-ferrous metal objects through the station, said detecting means comprising a single turn transmitting loop and two single turn receiving loops positioned on each side of the transmitting loop in spaced parallel relationship to each other and adjacent opposed ends of the station, an oscillator associated with the station, said oscillator including a transformer, the secondary coil of said transformer connected to said transmitting loop for inducing an electromagnetic field in said transmitting loop and serving both to determine the frequency of the oscillator and to match the impedance of the oscillator to the impedance of the single turn transmitting loop thereby permitting the loops to be formed from a single turn of wire, means connected to said receiving loops to tune said receiving loops to the frequency of the transmitting loop, first means in said station associated with the receiving loops for inducing a fixed voltage output in the receiving loops of sufficient magnitude to make the metal detecting station insensitive to metal objects substantially smaller than metal objects of interest to prevent the station from responding sufficiently to the movement of tiny metal objects through the station, second means in the station and connected to said first means in such a way that the second means operates only when said first means operates to induce a phase shift between the transmitting loop and said receiving loops, in such a direction that the metal-detecting station will be sensitive to both ferrous and non-ferrous metal objects passing through the station, said phase shift large enough to distort the electromagnetic field inside the station so that no likely combination of target-shape or target-orientation could pass through the station without disturbing the voltage on said receiving loops, and means associated with this station and connected to said receiving loops for providing an indication of any voltage change in said receiving loops caused by the passage of metal objects greater than a predetermined size through the station.

21. The metal detecting station described in claim 9 wherein the station has means therein for causing the voltage indicator associated with the station for providing an indication of any voltage change in the receiving loops to respond in separate ways dependant on the direction of motion of a metal object through the station.

* * * * *